US012563380B1

(12) United States Patent
Lee et al.

(10) Patent No.: US 12,563,380 B1
(45) Date of Patent: Feb. 24, 2026

(54) SYSTEM FOR MONITORING AND CONTROLLING TERMINAL THROUGH LINKAGE BETWEEN MOBILE TERMINAL AND SET-TOP BOX

(71) Applicant: ALT Co., Ltd., Seongnam-si (KR)

(72) Inventors: Sang Soo Lee, Seongnam-si (KR); Bo Yeon Lee, Seoul (KR)

(73) Assignee: ALT Co., Ltd., Seongnam-si (KR)

( * ) Notice: Subject to any disclaimer, the term of this patent is extended or adjusted under 35 U.S.C. 154(b) by 0 days.

(21) Appl. No.: 18/890,778

(22) Filed: Sep. 20, 2024

(30) Foreign Application Priority Data

Aug. 23, 2024 (KR) ........................ 10-2024-0113519

(51) Int. Cl.
| | |
|---|---|
| *H04W 8/18* | (2009.01) |
| *H04L 67/1396* | (2022.01) |
| *H04L 67/51* | (2022.01) |
| *H04N 21/4788* | (2011.01) |

(52) U.S. Cl.
CPC ........... *H04W 8/18* (2013.01); *H04L 67/1396* (2022.05); *H04L 67/51* (2022.05); *H04N 21/4788* (2013.01)

(58) Field of Classification Search
CPC ...... H04W 8/18; H04L 67/51; H04L 67/1396; H04L 67/125; H04L 67/52; H04L 12/12; H04L 12/1895; H04L 12/2801; H04L 12/2816; H04L 12/282; H04L 12/2823; H04L 12/2825; H04L 12/2829; H04L 12/2834; H04L 2012/2841; H04L 41/0806; H04L 51/48; H04L 51/58; H04L 67/04; H04L 67/10; H04L 67/12; H04L 67/141; H04L 67/306; H04L 69/329; H04N 21/4788; G16H 40/67; G16H 40/60; G16H 10/60; G16H 40/63; H04M 11/04; H04M 1/72415; H04M 1/72457; H04M 1/72436; H04M 2242/04
See application file for complete search history.

(56) References Cited

U.S. PATENT DOCUMENTS

| | | | | |
|---|---|---|---|---|
| 7,140,033 | B1 * | 11/2006 | Durden | ............ H04N 21/43637 |
| | | | | 348/E7.063 |
| 10,178,953 | B2 * | 1/2019 | Ji | ......................... A61B 5/4833 |
| 10,448,080 | B1 * | 10/2019 | Nijim | ................. H04N 21/6131 |

(Continued)

FOREIGN PATENT DOCUMENTS

| | | |
|---|---|---|
| KR | 10-0766889 B1 | 10/2007 |
| KR | 10-1678972 B1 | 11/2016 |

*Primary Examiner* — Greg C Bengzon
(74) *Attorney, Agent, or Firm* — NKL Law; Jae Youn Kim

(57) ABSTRACT

Disclosed is a monitoring and terminal control system through a linkage between a mobile terminal and a set-top box. A monitoring and terminal control system according to the present disclosure includes a protected person side set-top box which is installed at a protected person's home and communicatively connected to a protected person side mobile terminal when the protected person side mobile terminal is located at the protected person's home; and a service providing server which monitors a state of the protected person side mobile terminal when the protected person side mobile terminal and the protected person side set-top box are communicatively connected and controls the protected person side mobile terminal and/or the protected person side set-top box according to the monitoring result.

6 Claims, 3 Drawing Sheets

(56)                References Cited

U.S. PATENT DOCUMENTS

| | | | | |
|---|---|---|---|---|
| 11,361,857 B2 * | 6/2022 | Sudharsan | ............. | G16H 20/00 |
| 2002/0177435 A1 * | 11/2002 | Jenkins | ................. | H04W 4/185 |
| | | | | 455/466 |
| 2003/0090374 A1 * | 5/2003 | Quigley | ................. | G08B 21/24 |
| | | | | 340/506 |
| 2003/0208110 A1 * | 11/2003 | Mault | .................. | A61B 5/6826 |
| | | | | 600/300 |
| 2004/0203661 A1 * | 10/2004 | Lee | .......................... | H04W 4/20 |
| | | | | 455/414.1 |
| 2005/0038326 A1 * | 2/2005 | Mathur | .................. | G08B 25/08 |
| | | | | 348/E7.078 |
| 2005/0229103 A1 * | 10/2005 | King | ......................... | A61F 4/00 |
| | | | | 715/810 |
| 2005/0287994 A1 * | 12/2005 | Serafat | .................... | H04W 8/22 |
| | | | | 455/414.1 |
| 2009/0064220 A1 * | 3/2009 | Fan | ........................ | H04M 11/04 |
| | | | | 725/33 |
| 2009/0093688 A1 * | 4/2009 | Mathur | .................... | H04N 7/18 |
| | | | | 600/300 |
| 2009/0150925 A1 * | 6/2009 | Henderson | ............. | H04N 7/163 |
| | | | | 725/34 |
| 2009/0210917 A1 * | 8/2009 | Lafreniere | ............ | H04M 1/658 |
| | | | | 379/88.22 |
| 2009/0248828 A1 * | 10/2009 | Gould | .................. | G08B 27/005 |
| | | | | 705/1.1 |
| 2009/0323907 A1 * | 12/2009 | Gupta | ............... | H04M 3/42365 |
| | | | | 379/88.13 |
| 2010/0016683 A1 * | 1/2010 | Lemmers | ........... | H04L 12/2825 |
| | | | | 715/764 |
| 2010/0058415 A1 * | 3/2010 | Goergen | ............ | H04N 21/4147 |
| | | | | 725/110 |
| 2010/0315227 A1 * | 12/2010 | Emerson | ......... | H04N 21/25841 |
| | | | | 725/33 |
| 2010/0319021 A1 * | 12/2010 | Emerson | ................ | H04H 20/59 |
| | | | | 725/33 |
| 2011/0030021 A1 * | 2/2011 | Campagna | ....... | H04N 21/42203 |
| | | | | 725/117 |
| 2011/0090085 A1 * | 4/2011 | Belz | .................. | H04N 21/44218 |
| | | | | 348/143 |
| 2011/0093876 A1 * | 4/2011 | Belz | ........................ | H04H 60/33 |
| | | | | 725/12 |
| 2012/0036543 A1 * | 2/2012 | George | .............. | H04N 21/4396 |
| | | | | 725/106 |
| 2012/0218123 A1 * | 8/2012 | Ji | ......................... | A61B 5/0022 |
| | | | | 340/870.07 |
| 2013/0097240 A1 * | 4/2013 | Ling | ..................... | G06F 1/3234 |
| | | | | 709/204 |
| 2014/0152899 A1 * | 6/2014 | Newell | .................... | H04N 5/44 |
| | | | | 348/734 |
| 2014/0282705 A1 * | 9/2014 | Chatterjee | ........... | H04N 21/485 |
| | | | | 725/33 |
| 2015/0006456 A1 * | 1/2015 | Sudharsan | ............. | G16H 50/20 |
| | | | | 706/46 |
| 2015/0109122 A1 * | 4/2015 | Stern | ..................... | G08B 27/008 |
| | | | | 340/539.1 |
| 2015/0133025 A1 * | 5/2015 | Ponomarev | .............. | A63H 3/28 |
| | | | | 446/484 |
| 2015/0154492 A1 * | 6/2015 | Ponomarev | ............. | H04L 67/10 |
| | | | | 706/11 |
| 2015/0205931 A1 * | 7/2015 | Wang | ..................... | G16H 40/63 |
| | | | | 702/19 |
| 2016/0100379 A1 * | 4/2016 | Nguyen | ............ | H04M 1/72412 |
| | | | | 455/458 |
| 2016/0275776 A1 * | 9/2016 | Shen | ....................... | A61B 5/024 |
| 2016/0309221 A1 * | 10/2016 | Gonzalez | ........... | H04N 21/4126 |
| 2017/0086019 A1 * | 3/2017 | Rabinowitz | ........... | H04W 12/08 |
| 2018/0103211 A1 * | 4/2018 | Marino | .................. | G08C 17/00 |
| 2018/0234261 A1 * | 8/2018 | Choi | ........................ | G06F 3/167 |
| 2020/0076939 A1 * | 3/2020 | Lambourne | ............. | H04W 4/20 |
| 2023/0216702 A1 * | 7/2023 | Shen | ........................ | H04L 67/51 |
| | | | | 709/224 |
| 2023/0237797 A1 * | 7/2023 | Doken | .................... | G06T 11/00 |
| | | | | 345/633 |
| 2023/0367452 A1 * | 11/2023 | Graham | ............ | H04M 1/72454 |

* cited by examiner

SYSTEM FOR MONITORING AND CONTROLLING TERMINAL THROUGH LINKAGE BETWEEN MOBILE TERMINAL AND SET-TOP BOX

CROSS-REFERENCE TO RELATED APPLICATIONS

This application claims the priority of Korean Patent Application No. 10-2024-0113519 filed on Aug. 23, 2024, in the Korean Intellectual Property Office, the disclosure of which is incorporated herein by reference.

BACKGROUND OF THE INVENTION

Field of the Invention

The present disclosure relates to a system for monitoring and controlling a terminal which monitors a state of a mobile terminal of a protected person through a linkage between the mobile terminal and a set-top box and controls the mobile terminal and/or the set-top box of the protected person if necessary.

Description of the Related Art

A set-top box (STB) refers to digital broadcasting transmission/reception equipment which receives broadcasts or content that cannot be received by a television (TV) itself, such as cable/satellite broadcasting or internet streaming to allow a user to watch them on the TV.

Recently, as services providing IP-based multimedia content have become widespread in accordance with the convergence of the Internet and broadcasting, most homes or offices with TVs have set-top boxes installed.

In the meantime, socially, the number of single-person households is increasing and the population of an elderly person (seniors) living alone is continuously increasing. In particular, the elderly person living alone or those with health problems are experiencing many emotional difficulties due to feelings of isolation and disconnection as well as physical difficulties in life due to old age or illness.

There is an increasing demand for a system that can alleviate emotional difficulties and provide psychological stability for the protected person, such as the elderly person, and can provide more careful care to the protected person through a strengthened connection with the protected person, for protectors who are physically distant from the protected person. Such a system may be implemented more effectively and efficiently by utilizing the linkage between the protected person's mobile terminal, such as a smart phone, and the set-top box that is mostly installed in the protected person's home.

As related art documents, there are Korean Registered Patent Publication No. 10-0766889 (entitled Behave monitoring system using set top box for interactive digital broadcasting, published on Oct. 15, 2007) and Korean Registered Patent Publication No. 10-1678972 (entitled Emergency system using set-top box and control method thereof, published on Nov. 24, 2016).

Related Art Document

Korean Registered Patent Publication No. 10-0766889 (Published on Oct. 15, 2007).

Korean Registered Patent Publication No. 10-1678972 (Published on Nov. 24, 2016).

SUMMARY OF THE INVENTION

An object of the present disclosure is to provide a system for monitoring and controlling a terminal through a linkage between a mobile terminal and a set-top box which alleviates the emotional difficulty of the protected person and provides psychological stability through the linkage of the mobile terminal and the set-top box and gives great help to the protector in providing more careful care to the protected person.

According to an aspect of the present disclosure, the object is achieved by a monitoring and terminal control system through a linkage between a mobile terminal and a set-top box including a protected person side set-top box which is installed at a protected person's home and communicatively connected to a protected person side mobile terminal when the protected person side mobile terminal is located at the protected person's home; and a service providing server which monitors a status of the protected person side mobile terminal when the protected person side mobile terminal and the protected person side set-top box are communicatively connected and controls the protected person side mobile terminal and/or the protected person side set-top box according to the monitoring result.

Desirably, when the service providing server receives contact information of the protected person side mobile terminal according to the communicative connection of the protected person side mobile terminal to the protected person side set-top box, the service providing server determines that the protected person side mobile terminal is located at the protected person's home.

Desirably, as a result of monitoring a status of the protected person side mobile terminal through the protected person side set-top box, if the status of the protected person side mobile terminal is different from a predetermined terminal status, the service providing server controls the protected person side mobile terminal through the protected person side set-top box to automatically change the status of the protected person side mobile terminal to a predetermined terminal status.

Desirably, as a result of monitoring a status of the protected person side mobile terminal through the protected person side set-top box, if the status of the protected person side mobile terminal is different from a predetermined terminal status, the service providing server may control the protected person side set-top box to output a message of requesting to change the status of the protected person side mobile terminal to a predetermined terminal status to an image output device connected to the protected person side set-top box.

Desirably, the service providing server may monitor at least one of a notification mode state (silent mode, vibration mode, and ringtone mode) of the protected person side mobile terminal and a power charging state of the protected person side mobile terminal through the protected person side set-top box.

Desirably, the monitoring and terminal control system further includes a protector side set-top box installed at a protector's home and the service providing server monitors at least one of main activity information of the protected person and health-related information of the protected person collected by the protected person side mobile terminal and/or the protected person side set-top box and provides the monitoring result to the protector through the protector side set-top box or to the protected person through the protected person side set-top box.

Desirably, the monitoring and terminal control system further includes a protector side set-top box installed at a protector's home and as the protected person side mobile terminal is communicatively connected to the protected person side set-top box, even though it is confirmed that the protected person is at the protected person's home, if the contact is not made to the protected person side mobile terminal, the service providing server transmits the protector's message received from the protector side set-top box or the protector side mobile terminal to the protected person side set-top box to output the message to the image output device connected to the protected person side set-top box.

Desirably, the service providing server checks a mode state of the protected person side set-top box, a power state of an image output device connected to the protected person side set-top box, and an external input status of the image output device and if necessary, may transmit a control signal for switching or changing at least one of the mode state of the protected person side set-top box, the power state of the image output device, and the external input status of the image output device to the protected person side set-top box.

According to the exemplary embodiment of the present disclosure, the monitoring and terminal control system through a linkage between a mobile terminal and a set-top box monitors a state of a mobile terminal of a protected person through a set-top box installed at home of the protected person and controls a mobile terminal and/or a set-top box of the protected person according to the monitoring result to alleviate emotional difficulties of the protected person and give psychological stability and provide the protector with great help for more careful care to the protected person.

According to the exemplary embodiment of the present disclosure, the monitoring and terminal control system through a linkage between a mobile terminal and a set-top box provides response, such as daily life monitoring of the protected person and terminal control therefor, without being limited to monitoring and notification for a dangerous situation of the protected person, to strength the emotional connectivity between the protected person and the protector who are physically separated from each other, thereby improving psychological stability and bonding, and greatly contributing to maintaining the protected person's safe and healthy life.

According to the exemplary embodiment of the present disclosure, the monitoring and terminal control system through a linkage between a mobile terminal and a set-top box uses both the mobile terminal and the set-top box, rather than single use of the mobile terminal, to more reliably and carefully monitor the protected person and provide prompt responses accordingly by means of the complementary of the mobile terminal and the set-top box.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENT

In order to sufficiently understand the present disclosure, the operational advantages of the present disclosure, and the objectives achieved by the exemplary embodiments of the present disclosure, the accompanying drawings illustrating preferred exemplary embodiments of the present disclosure and the contents described therein need to be referred to.

Hereinafter, the present disclosure will be described in detail by explaining preferred exemplary embodiments of the present disclosure with reference to the accompanying drawings. However, when the present disclosure is described, the description of the known functions or configurations will be omitted to clarify the gist of the present disclosure.

Figure 1:
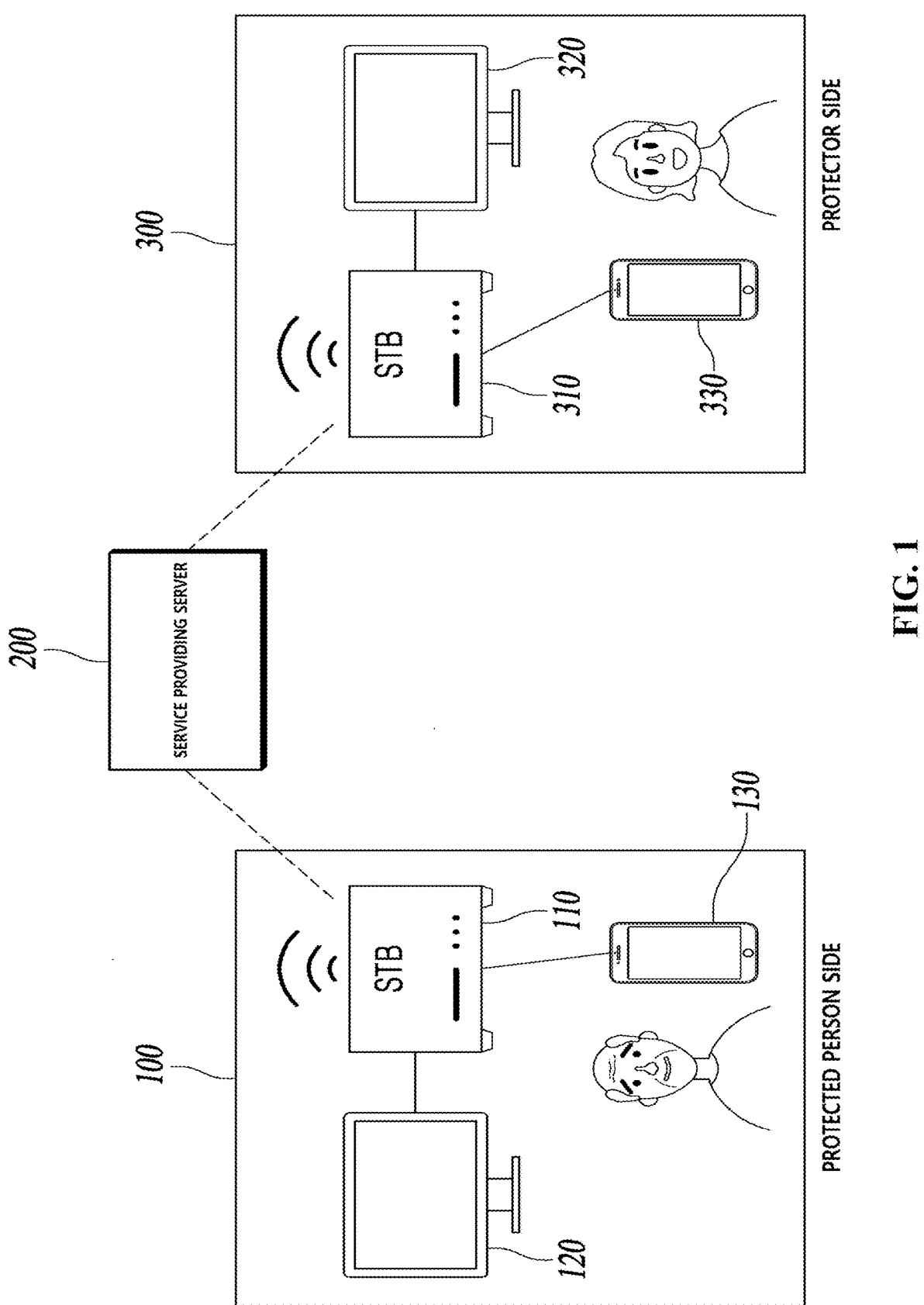
FIG. 1 is a view illustrating a configuration of a monitoring and terminal control system through a linkage between a mobile terminal and a set-top box according to an exemplary embodiment of the present disclosure.
Figure 2:
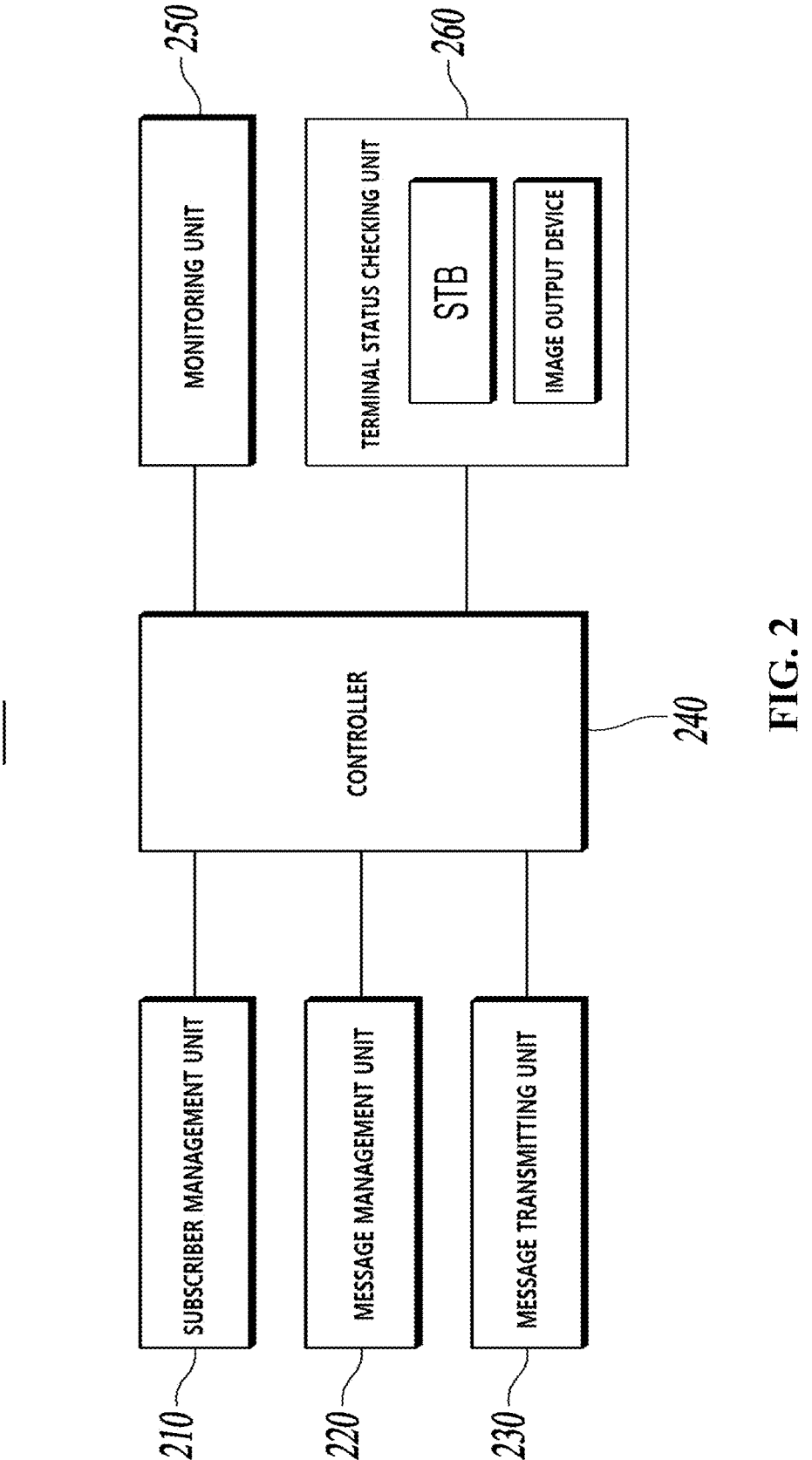
FIG. 2 is a view illustrating a configuration of a service providing server in a monitoring and terminal control system of FIG. 1.

FIG. 1 is a view illustrating a configuration of a monitoring and terminal control system through a linkage between a mobile terminal and a set-top box according to an exemplary embodiment of the present disclosure and FIG. 2 is a view illustrating a configuration of a service providing server in a monitoring and terminal control system of FIG. 1.

A monitoring and terminal control system through a linkage between a mobile terminal and a set-top box according to an exemplary embodiment of the present disclosure (hereinafter, simply referred to as a "monitoring and terminal control system") includes a protected person side terminal 100, a protector side terminal 300, and a service providing server 200 which is communicatively connected to the protected person side terminal 100/protector side terminal 300 to monitor the protected person side terminal 100 and control the protected side terminal 100 if necessary.

Here, the service providing server 200 provides monitoring information of the protected person side terminal 100 to the protector side terminal 300 and may transmit a message to the protected person side terminal 100 or transmit a control signal for changing or switching a state of the protected person side terminal 100 to the protected person side terminal 100 in accordance with the request of the protector side terminal 300.

Referring to FIG. 1, the protected person side terminal 100 may include a protected person side set-top box 110, an image output device 120 connected to the protected person side set-top box 110, and a protected person side mobile terminal 130. The protector side terminal 300 may include a protector side set-top box 310, an image output device 320 connected to the protector side set-top box 310, and a protector side mobile terminal 330.

Here, representative image output devices 120 and 320 are television TVs which are connected to the set-top boxes 110 and 310 through an HDMI cable, and may also include a notebook, a monitor, and a tablet. The mobile terminals 130 and 330 may include a smart phone or a smart watch carried by the protected person/the protector and the mobile terminals 110 and 330 may be communicatively connected to the service providing server 200 through a mobile communication network or Internet network and if the mobile terminals are located at the protected person/protector's home, may be communicatively connected to the set-top boxes 110 and 310 through a near field wireless communication network, such as Bluetooth or a wireless router.

In order to establish the communicative connection between the set-top boxes 110 and 310 and the mobile terminals 130 and 330, an authentication process may be performed between the set-top boxes 110 and 310 and the mobile terminals 130 and 330 in advance. For example, the service providing server 200 transmits a QR code as an authentication code to the set-top boxes 110 and 310 to output the QR code on the image output devices 120 and 320 and the mobile terminals 130 and 330 scan and recognize the QR code through built-in camera modules to perform the authentication process. By doing this, the communicative connection and the linkage thereby may be established between the set-top boxes 110 and 310 and the mobile terminals 130 and 330.

In the meantime, the protected person side set-top box 110 and the image output device 120 are installed at the protected person's home and the protector side set-top box 310 and the image output device 320 are installed at the protector's home. At this time, the protected person's home and the protector's home are assumed as independent spaces which are spaced apart from each other.

Referring to FIGS. 1 and 2, when the protected person side mobile terminal 130 and the protected person side set-top box 110 are communicatively connected, the service providing server 200 monitors a status of the protected person side mobile terminal 130 through the protected person side set-top box 110 and controls the protected person side set-top box 110 and/or the protected person side mobile terminal 130 according to the monitoring result.

At this time, when the service providing server 200 receives the connection information of the protected person side mobile terminal 130 in accordance with the communicative connection of the protected person side mobile terminal 130 to the protected person side set-top box 110 from the protected person side set-top box 110, the service providing server 200 may determine that the protected person side mobile terminal 130 is located at the protected person's home.

Specifically, as a result of monitoring the status of the protected person side mobile terminal 130 through the protected person side set-top box 110, if the status of the protected person side mobile terminal 130 is different from a predetermined terminal status, the service providing server 200 controls the protected person side mobile terminal 130 through the protected person side set-top box 110 to automatically change the status of the protected person side mobile terminal 130 to a predetermined terminal status.

In contrast, as a result of monitoring the status of the protected person side mobile terminal 130 through the protected person side set-top box 110, if the status of the protected person side mobile terminal 130 is different from a predetermined terminal status, the service providing server 200 may control the protected person side set-top box 110 to output a message for requesting or recommending to change the status of the protected person side mobile terminal 130 to a predetermined terminal status to the image output device 120 connected to the protected person side set-top box 110 as images and voices, together with information about the current status of the protected person side mobile terminal 130.

Here, the status of the protected person side mobile terminal 130 is a notification mode status (silent mode, vibration mode, and ringtone mode) and a power charging status (remaining battery capacity). That is, the service providing server 200 may monitor a notification mode state and a power charging state of the protected person side mobile terminal 130 through the protected person side set-top box 110.

For example, if the protected person sets the notification mode state of the protected person side mobile terminal 130 to a silent mode or a vibration mode when going out, and leaves it as is after returning to the protected person's home, the protected person may not be able to check calls, text messages, various notifications, etc. received on the protected person side mobile terminal 130 in a timely manner. Therefore, when the protected person side mobile terminal 130 is communicatively connected to the protected person side set-top box 110 so that it is determined that the protected person side mobile terminal 130 is located at the protected person's home, the service providing server 200 may control the protected person side set-top box 110 to automatically change a notification mode status of the protected person side mobile terminal 130 to a previously set ringtone mode or output a message for requesting to change the notification mode status of the protected person side mobile terminal 130 to a previously set ringtone mode, that is, messages such as "Did you have a good time, Mr. 000?Mr. 000's smart phone is currently in a vibration mode. How about changing it to ringtone mode so that you don't miss any calls or texts?" to the image output device 120 connected to the protected person side set-top box 110.

As another example, as a result of monitoring a power charging status of the protected person side mobile terminal 130 through the protected person side set-top box 110, if the charging amount (a remaining battery capacity) of the protected person side mobile terminal 130 is lower than a predetermined charging amount, the service providing server 200 may control the protected person side set-top box 110 to output a message of requesting to charge the battery of the protected person side mobile terminal 130, that is, a message such as "Mr. 000, your smart phone's battery only has 10% left. Please charge your smart phone", together with current charging amount information of the protected person side mobile terminal 130, to the image output device 120 connected to the protected person side set-top box 110.

Further, the service providing server 200 monitors main activity information of the protected person and health-related information of the protected person, collected by the protected person side mobile terminal 130 and/or the protected person side set-top box 110 through the protected person side set-top box 110 and may provide the monitoring result to the protector as a customized message through the protector side set-top box 310 and/or the protector side mobile terminal 330 or to the protected person as a customized message through the protected person side set-top box 110 and/or the protected person side mobile terminal 130.

Here, the main activity information of the protected person may include a daily activity amount, a mobile terminal usage time, peculiarities about the mobile terminal status, TV watching information. The health-related information of the protected person may include health-related information such as a protected person's heart rate and the number of steps measured through sensors installed on the mobile terminal and applications installed on the mobile terminal.

Desirably, the service providing server 200 may provide the monitoring result of the protected person's main activity information and the protected person's health-related information to the protector by outputting a customized message to the image output device 320 connected to the protector side set-top box 310 or provide the monitoring result to the protected person by outputting a customized message to the image output device 120 connected to the protected person side set-top box 110.

<Example of Message Displayed on Image Output Device Connected to Protector's Set-Top Box>

"Yesterday exercise amount of Mr. OOO is 2000 steps. The activity amount is less than usual (average of 6000 steps over 5 days of the weekdays). How about contacting him?"

"Mr. OOO stayed at home yesterday, but did not watch TV at all. Is there anything that he feels uncomfortable about?"

<Example of Message Displayed on Image Output Device Connected to Protected Person's Set-Top Box>

"Good morning! Your yesterday exercise amount was 2000 steps. Today, the fine dust index is low and the weather is nice, so why not go outside and take a walk?Try increasing your exercise a little bit more!".

Moreover, the service providing server 200 transmits the data of the main activity information and the health-related information of the protected person to the protector side set-top box 310 in real time and visualizes the data to output the visualized data to the image output device 320 connected to the protector's set-top box 310. Therefore, the protector may share and receive visualized contents about the main activity information and the health-related information of the protected person at a remote place in real time.

As the protected person side mobile terminal 130 is communicatively connected to the protected person side set-top box 110, even though it is confirmed that the protected person is at the protected person's home or the protected person side mobile terminal 130 is located at the protected person's home, when the contact is not made to the protected person side mobile terminal 130, the service providing server 200 transmits the protector's message received from the protector side set-top box 310 or the protector side mobile terminal 330 to the protected person side set-top box 110 to output the message to the image output device 120 connected to the protected person side set-top box 110.

In the meantime, before transmitting the message to the protected person side set-top box 110, the service providing server 200 may check the mode state of the protected person side set-top box 110, the power state of the image output device 120 connected to the protected person side set-top box 110, and the external input status of the image output device 120. If it is necessary to output the message to the image output device 120, the service providing server 200 may transmit a control signal (or a command) for switching or changing at least one of the mode state of the protected person side set-top box 110, the power state of the image output device 120, and the external input status of the image output device 120 to the protected person side set-top box 110.

Specifically, when the mode state of the protected person side set-top box 110 is a standby mode as a result of checking the mode state of the protected person side set-top box 110, the service providing server 200 may transmit the control signal for switching the protected person side set-top box 110 to the operation mode to the protected person side set-top box 110. When the power state of the image output device 120 is OFF as a result of checking the power state of the image output device 120, the service providing server 200 may transmit a control signal for switching the power state of the image output device 120 to ON to the protected person side set-top box 110. At this time, the protected person side set-top box 110 which receives the control signal may display the corresponding message on the screen of the image output device 320 after turning on the power of the image output device 320 through the HDMI. When the external input status is a different port from a communication port between the protected person side set-top box 110 and the service providing server 200 as a result of checking the external input status of the image output device 120, the service providing server 200 may transmit a control signal to the protected person side set-top box 110 to change the external input status to the same port as the communication port between the protected person side set-top box 110 and the service providing server 200. At this time, the protected person side set-top box 110 which receives the control signal may display the corresponding message on the screen of the image output device 320 after changing the external input status of the image output device 120 to the communication port between the protected person side set-top box 110 and the service providing server 200 through the HDMI.

The service providing server 200 as described above may be implemented to include a subscriber management unit 210, a message management unit 220, a message transmitting unit 230, a controller 240, a monitoring unit 250, and a terminal status checking unit 260, as illustrated in FIG. 2.

The subscriber management unit 210 performs device-registration of the protected person side terminal 100 and the protector side terminal 300 through a service subscribing procedure and registers the relationship between the protected person and the protector through a link procedure in advance.

The message management unit 220 classifies, stores, and manages contents of the message to be provided to the protected person and the protector according to the state of the protected person side terminal 100 or the information collected by the protected person side terminal 100. At this time, the message may be provided as texts, images, audios, or videos. Further, the message contents may be changed by the protected person or the protector to be customized and also set whether to be output as images only or output as voices, too.

The message transmitting unit 230 transmits a message which is stored and managed by the message management unit 220 or a message which is transmitted or requested by the protector/protected person to the protected person side terminal 100 or the protector side terminal 300.

The monitoring unit 250 monitors the state of the protected person side mobile terminal 130 through the protected person side set-top box 110. Specifically, as described above, the monitoring unit 250 may monitor the notification mode status (silent mode, vibration mode, and ringtone mode) of the protected person side mobile terminal 130 and the power charging status (a remaining battery capacity) through the protected person side set-top box 110. Further, the monitoring unit 250 may monitor the main activity information of the protected person and the health-related information of the protected person collected by the protected person side mobile terminal 130 and/or the protected person side set-top box 110 through the protected person side set-top box 110.

The terminal status checking unit 260 checks the mode state of the protected person side set-top box 110, the power state of the image output device 120 connected to the protected person side set-top box 110, and the external input status of the image output device 120 as described above, to normally output the monitoring result of the monitoring unit 250 or the message transmitted by the message transmitting unit 230 to the image output device 120 connected to the protected person side set-top box 110 or the image output device 320 connected to the protector side set-top box 310.

The controller 240 controls the overall operations of the subscriber management unit 210, the message management unit 220, the message transmitting unit 230, the monitoring unit 250, and the terminal status checking unit 260 and also controls the protected person side terminal 100 and/or the protector side terminal 300, to provide the risk monitoring and the terminal control according to the present disclosure.

Specifically, as described above, when the status of the protected person side mobile terminal 130 is different from a predetermined terminal status, the controller 240 controls the protected person side mobile terminal 130 through the protected person side set-top box 110 to automatically change the status of the protected person side mobile terminal 130 to the predetermined terminal status. In contrast, when the status of the protected person side mobile terminal 130 is different from a predetermined terminal status, the controller 240 may control the protected person side set-top box 110 to output a message requesting to change the status of the protected person side mobile terminal 130 to the predetermined terminal status to the image output device 120 connected to the protected person side set-top box 110 as images and voices. In the meantime, the controller 240 may transmit a control signal (or a command) for switching or changing the mode state of the protected person side set-top box 110, the power state of the image output device 120 connected to the protected person side set-top box 110, and/or the external input status of the image output device 120 to the protected person side set-top box 110.

Figure 3:
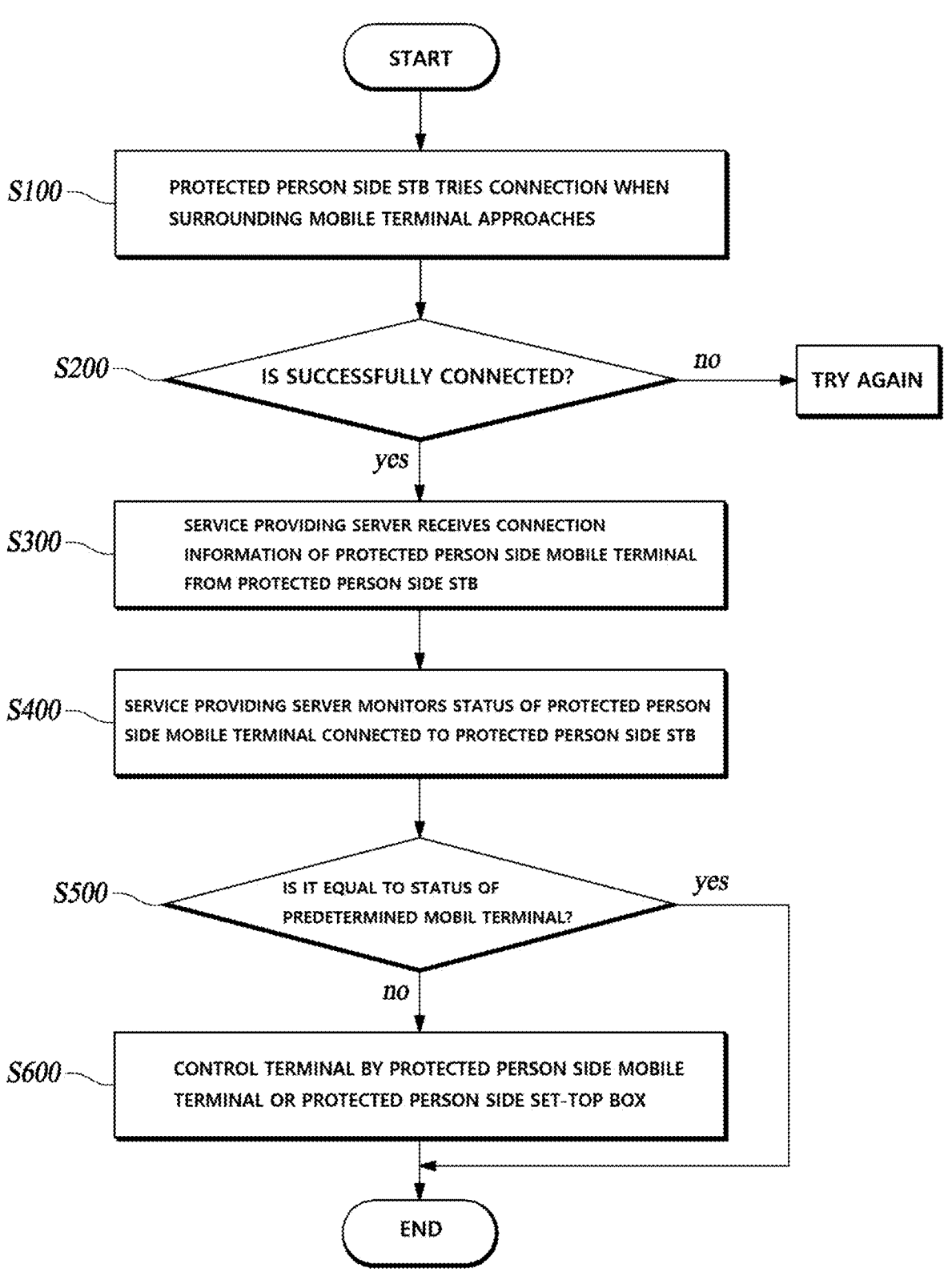
FIG. 3 is a flowchart illustrating a monitoring and terminal control method through a linkage between a mobile terminal and a set-top box according to an exemplary embodiment of the present disclosure.

Hereinafter, a monitoring and terminal control method through a linkage between a mobile terminal and a set-top box according to an exemplary embodiment of the present disclosure will be described with reference to FIG. 3.

First, when a surrounding mobile terminal approaches, the protected person side set-top box 110 installed at the protected person's home tries communicative connection with the mobile terminal (S110).

Next, if the mobile terminal succeeds in establishing the communicative connection with the protected person side set-top box 110 through the protected side mobile terminal 130 (S200), the service providing server 200 receives contact information of the protected side mobile terminal 130 communicatively connected to the protected person side set-top box 110 from the protected person side set-top box 110 (S300). At this time, when the service providing server 200 receives contact information of the protected side mobile terminal 130, the service providing server 200 determines that the protected person side mobile terminal 130 is located at the protected person's home.

Next, the service providing server 200 monitors the status of the protected person side mobile terminal 130 communicatively connected to the protected person side set-top box 110 (S400).

Next, the service providing server 200 checks whether the status of the protected person side mobile terminal 130 is equal to the predetermined terminal status (S500).

Next, if the status of the protected person side mobile terminal 130 is different from the predetermined terminal status, the service providing server 200 controls the protected person side mobile terminal 130 or the protected person side set-top box 110 to automatically change the status of the protected person side mobile terminal 130 to the predetermined terminal status or output a message requesting to change the status, to the image output device 120 connected to the protected person side set-top box 110 (S600).

Although the present disclosure has been described in detail above with the exemplary embodiments of the present disclosure, it is obvious to those skilled in the art that the present disclosure is not limited to the above-described exemplary embodiments, but various modifications and variations can be made without departing from the spirit and scope of the present disclosure. Accordingly, such modifications or variations should fall within the scope of the claims of the present disclosure.

What is claimed is:

1. A monitoring and terminal control system, comprising:
a protected person side set-top box which is installed at a protected person's home and communicatively connected to a protected person side mobile terminal when the protected person side mobile terminal is located at the protected person's home; and
a service providing server which monitors a status of the protected person side mobile terminal when the protected person side mobile terminal and the protected person side set-top box are communicatively connected and controls the protected person side mobile terminal and/or the protected person side set-top box according to a monitoring result,
wherein if the monitoring result indicates that the status of the protected person side mobile terminal is different from a predetermined terminal status, the service providing server controls the protected person side set-top box to output a message of requesting to change the status of the protected person side mobile terminal to the predetermined terminal status on an image output device connected to the protected person side set-top box,
wherein the service providing server monitors at least one of a notification mode state and a power charging state of the protected person side mobile terminal through the protected person side set-top box, and
wherein the notification mode state of the protected person side mobile terminal includes a silent mode, a vibration mode, and a ringtone mode.

2. The monitoring and terminal control system according to claim 1, wherein when the service providing server receives contact information of the protected person side mobile terminal according to the communicative connection of the protected person side mobile terminal to the protected person side set-top box, the service providing server determines that the protected person side mobile terminal is located at the protected person's home.

3. The monitoring and terminal control system according to claim 1, wherein if the monitoring result indicates that the status of the protected person side mobile terminal is different from the predetermined terminal status, the service providing server further controls the protected person side mobile terminal through the protected person side set-top box to automatically change the status of the protected person side mobile terminal to the predetermined terminal status.

4. The monitoring and terminal control system according to claim 1, further comprising:
a protector side set-top box installed at a protector's home,
wherein the service providing server monitors at least one of main activity information of the protected person and health-related information of the protected person collected by the protected person side mobile terminal and/or the protected person side set-top box and provides the monitoring result to a protector through the protector side set-top box or to the protected person through the protected person side set-top box.

5. The monitoring and terminal control system according to claim 1, further comprising:

a protector side set-top box installed at a protector's home, wherein as the protected person side mobile terminal is communicatively connected to the protected person side set-top box, even though it is confirmed that a protected person is at the protected person's home, if contact is not made to the protected person side mobile terminal, the service providing server transmits a protector's message received from the protector side set-top box or a protector side mobile terminal to the protected person side set-top box to output the protector's message on an image output device connected to the protected person side set-top box.

6. The monitoring and terminal control system according to claim 1, wherein the service providing server checks a mode state of the protected person side set-top box, a power state of an image output device connected to the protected person side set-top box, and an external input status of the image output device and is configured to transmit a control signal for switching the mode state of the protected person side set-top box, the power state of the image output device, and the external input status of the image output device to the protected person side set-top box.

* * * * *